(No Model.)
R. D. O. SMITH.
ELECTRIC CONTROLLER FOR POWER MECHANISM.
No. 436,843. Patented Sept. 23, 1890.
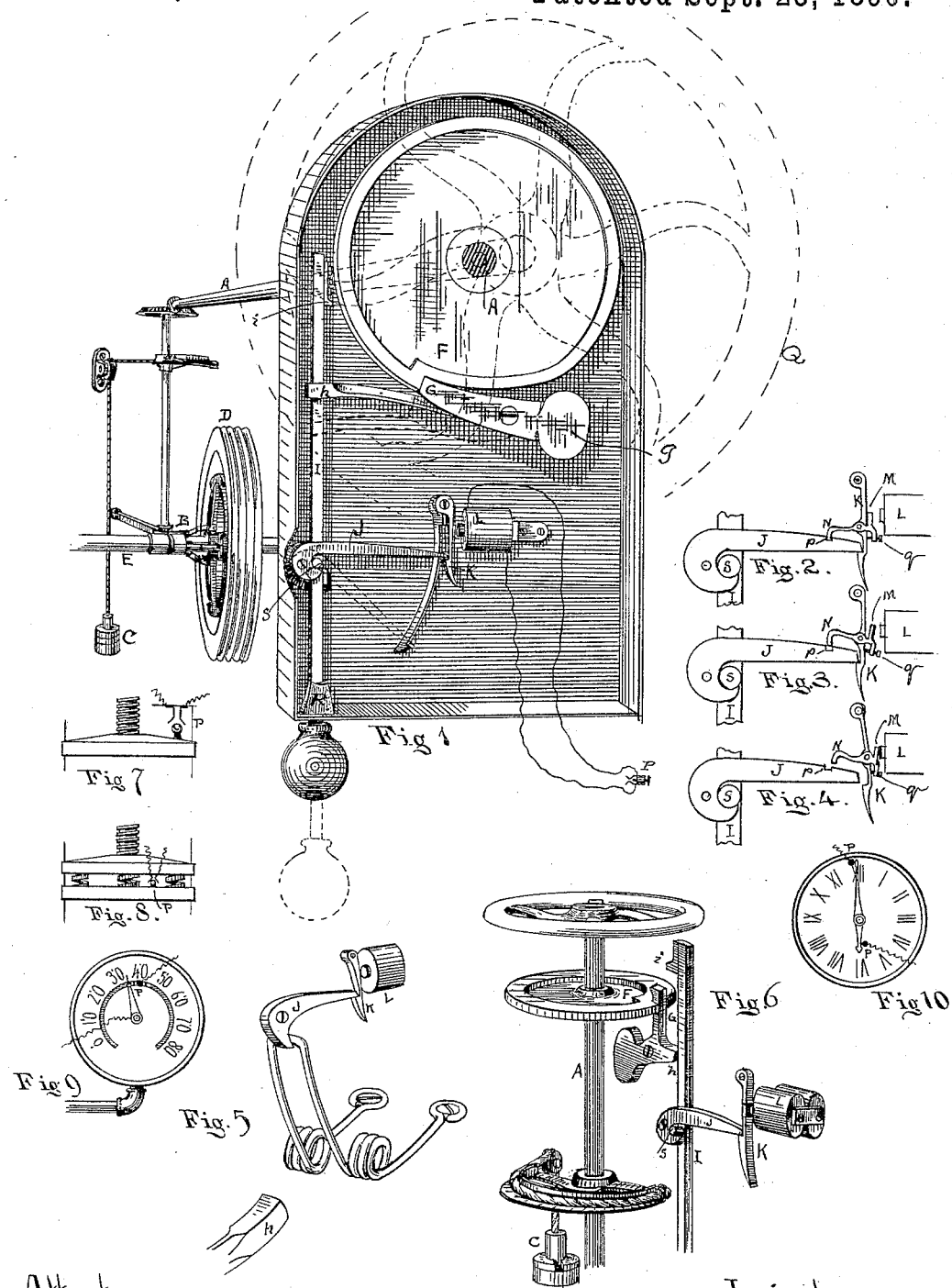
Attest.
D. O'Douda
M. W. Mix
Inventor.
R. D. O. Smith

UNITED STATES PATENT OFFICE.

ROBERT D. O. SMITH, OF MISHAWAKA, INDIANA.

ELECTRIC CONTROLLER FOR POWER MECHANISMS.

SPECIFICATION forming part of Letters Patent No. 436,843, dated September 23, 1890.

Application filed June 26, 1889. Serial No. 315,578. (No model.)

*To all whom it may concern:*

Be it known that I, ROBERT D. O. SMITH, of Mishawaka, in the county of St. Joseph and State of Indiana, have invented a new and useful Improved Electric Let-Off for Releasing Automatic Devices which Disconnect Machinery from the Motor; and I do hereby declare that the following is a full and accurate description of the same, having reference to the accompanying drawings, wherein—

Figure 1 is a perspective view of an apparatus embodying my invention. Figs. 2, 3, and 4 represent an automatic lock for the apparatus. Figs. 5 and 6 represent modifications. Figs. 7, 8, 9, and 10 represent the mode of rendering the circuit-closing automatic.

I am aware that it is not new to release automatic mechanism by means of electricity, and therefore I do not claim, broadly, a device operating electrically for that purpose; but I am not aware that heretofore a gravity or momentum device has been coupled with an electric latch, whereby the force necessary to effect the disconnection of the machine from its motor is entirely distinct from but supplemental to the electric force necessary to release said disconnecting force. In my invention these two forces are coupled to effect the disconnection of the machine from its motor—that is to say, supposing the actual release of the disconnecting force requires a force equal to the momentum of ten pounds falling a distance of five inches, the actual release of the ten pounds requires only a pull equal to two ounces or less of the spring-balance. To effect the disconnection directly by electricity would require an electro-motive force of perhaps a thousand volts, whereas by the indirection described a force of two volts is sufficient.

Having indicated the nature of my invention, I will now describe a typical mechanism embodying the same.

A is a shaft connected with the automatic disconnecting mechanism and under stress of the disconnecting force. In Fig. 1 this shaft is represented as extending to some distance and at its most distant end in connection with a clutch B and under stress of a suspended weight C, the gravity of which is sufficient when liberated to pull said clutch out of connection and thereby disconnect the pulley-wheel D from its motor-shaft E; but it is apparent that this organization may be indefinitely varied, and that, so far as the invention is concerned, it is simply required that the force whereby the mechanisms are disconnected shall be applied to the shaft A or its equivalent and be restrained or released by the action of my invention. The stop F is attached to the shaft A and is held in arrest by a pawl G. The stop F is conveniently and preferably made in the form of a disk with a stop-notch for the engagement of the pawl. The disk form is preferred because when released it will revolve rapidly and be less liable to engage or injure anything which may accidentally approach its path, and a single notch is sufficient, because in resetting it the same position will always be resumed. The pawl G is self-setting, either by gravity or a spring. I prefer gravity—such as the gravitating effect of a counter-weight g, formed with or attached to the end of the pawl—when it can be applied, because it is not liable to derangement; but it is sometimes necessary to place the apparatus in such position that gravity is not applicable, and in that case a spring may be applied.

In a large apparatus the force represented by the weight C is considerable, and the pressure upon the end of the pawl G is proportionate to that force. Therefore the force necessary to pull the pawl G out of engagement with the stop F is proportionate to the pressure which it resists, and to effect that release by electricity directly applied would require a very large battery-power.

I am aware that the direct release may be made with less power by making the pawl sensitive—as, for instance, by making it with a toggle-joint or by giving it a very shallow notch in the stop—so that a slight movement will release it; but all such methods tend to complication and insecurity, because in connection with running machinery of all kinds the constant tremor and jar is a disturbing force which is constantly to be contended with. I therefore, instead of a direct pull, substitute the force of a blow to remove the pawl from its engagement, and to that end I provide the pawl with a place whereon said blow can be delivered. In Fig. 1 this place is an arm $h$, and the blow is delivered by the rod I, which may be impelled by gravity or by a spring of sufficient power, as in Fig. 5. When the apparatus can be so placed that the rod can be suspended and permitted to fall to deliver its blow, gravity is preferable to a spring. The rod I may be weighted to any desired extent to increase the force of its blow. The rod I is provided with a shoulder $i$, which when said rod is liberated drops upon the arm $h$ and forces the pawl G out of engagement with the stop F, and by its weight holds said pawl out of engagement until said rod I has been lifted and reset. The lever J, being above the pin or shoulder S, is lifted again when the rod I is lifted, and the re-engagement of said lever with the latch K constitutes the resetting, which permits the pawl G to re-engage its stop F.

To suspend the rod I and hold it out of action, I employ a lever J and a latch K. The lever J is pivoted close to the rod I and is made in form of a hook or otherwise to engage with a pin or shoulder S on said rod and prevent it from leaving its position. The lever J may be made sufficiently long to sustain the weight of said rod with but little pressure on the latch K.

The electro-magnet L is mounted in front of the latch K sufficiently close to bring the said latch or armature attached to it within the magnetic field. When the circuit is closed, the latch K will be instantly withdrawn and the moving forces liberated to release the mechanism from its motor.

The wheel Q is a hand-wheel on shaft A, and represents means for resetting the stop after it has been disengaged.

R is a rubber cushion to arrest the pin S when the let-off is discharged.

The electrical circuit may be extended to any desired distance—as, for instance, to different parts of a manufacturing establishment—so that the desired disengagement may be effected electrically by closing circuit at a button P, located at any convenient distant point.

If the apparatus is subjected to continual jar or tremor, owing to the vicinity of running machinery, &c., there may be liability that the latch K will be shaken loose and the let-off weight liberated. To prevent that an automatic lock may be placed where it will prevent such accidental release, and said lock may be actuated by the electric current, which is designed to release the let-off. In Figs. 2, 3, and 4 I represent in a typical way such a lock. The armature M is pivoted to the latch K and carries a hook-lock N, which when the parts are in action engages with a keeper-notch P in the top of the lever J. When the magnet L is excited, the armature is drawn back on its pivot far enough to lift the lock N out of said keeper, and then the latch K is in turn at liberty to be drawn back and said lever liberated. $q$ is an adjusting-screw for said lock.

As a safety attachment to machines—such as heavy presses, &c.—to prevent self-damage by overmotion or overstrain, the circuit-closer may be automatically operated when the pressure exceeds a certain maximum or when the movement has passed a certain safe point. Figs. 7 and 8 illustrate this automatic closing of the circuit to protect a moving machine from "overmotion" or "overpressure," which may be convertible terms.

In Fig. 7 is represented the moving member of a machine, and it has attached to it the circuit-closer P, which is adjusted to close the circuit when said moving member has reached a certain point in its course. In Fig. 8 the moving part is arranged with a yielding member, so that said part will cease to advance when a certain maximum pressure has been attained. In that case at a certain point the motion is transferred to the yielding member and the circuit-closer is carried by that member. If the machine operates by fluid under pressure, then the circuit may be carried by any convenient form of pressure-gage, as shown in Fig. 9. The circuit-closer may also, if desired, be operated by a time mechanism, so as to automatically stop the machinery on the arrival of a certain hour.

Having described my invention, what I claim as new is—

1. In an electrical let-off or releasing-gear, a stop F and pawl G, provided with an extended arm $h$ and a counter-weight, a vertical momentum-rod I, having a projection $i$ to engage said arm and having a pin S, a hooked lever J, to engage said pin at the point of the hook below the lever, and a latch K, combined with an electro-magnet and battery-circuit provided with one or more circuit-closers, substantially as set forth.

2. In an electric let-off or releasing-gear, a stop and pawl to arrest the disconnecting force, a momentum device to disengage said pawl by a blow, a hook-lever J, to restrain said momentum device and fall down in the path of the same when released, so that the act of raising the momentum device will cause said lever to be reset again, and an electric latch to restrain and release said momentum device electrically, substantially as set forth.

3. The combination, with the weight, the stop-wheel and pawl provided with the extended arm $h$, and the counter-weight, of the momentum-rod I, the sustaining-lever, the latch K, and the electro-magnet L, with its battery-circuit and circuit-closers P, substantially as set forth.

4. The momentum device, the sustaining-lever J, latch K, and electro-magnet L, combined with the lock N, mounted on the latch K, adapted to engage the lever J, and connected with the armature M, whereby when excited said magnet will cause said lock to be disengaged and afterward the latch to be withdrawn, as set forth.

5. The momentum device, the electrical releasing device, and the disconnecting mechanism, substantially as described, combined with the moving machine and a circuit-closer automatically closed by the action of said machine to effect its disengagement from its motor automatically, for the purpose set forth.

R. D. O. SMITH.

Witnesses:
D. O. FONDA,
M. W. MIX.